US011190836B2

(12) United States Patent
Song et al.

(10) Patent No.: US 11,190,836 B2
(45) Date of Patent: Nov. 30, 2021

(54) AUDIO PLAYING AND TRANSMITTING METHODS AND APPARATUSES

(71) Applicant: Hisense Visual Technology Co., Ltd., Qingdao (CN)

(72) Inventors: Ziquan Song, Qingdao (CN); Xiujuan Pang, Qingdao (CN)

(73) Assignee: Hisense Visual Technology Co., Ltd., Qingdao (CN)

( * ) Notice: Subject to any disclaimer, the term of this patent is extended or adjusted under 35 U.S.C. 154(b) by 50 days.

(21) Appl. No.: 16/588,510

(22) Filed: Sep. 30, 2019

(65) Prior Publication Data

US 2020/0204854 A1 Jun. 25, 2020

Related U.S. Application Data

(63) Continuation of application No. PCT/CN2019/104971, filed on Sep. 9, 2019.

(30) Foreign Application Priority Data

Dec. 20, 2018 (CN) .......................... 201811565099.4
Dec. 20, 2018 (CN) .......................... 201811565526.9
Dec. 20, 2018 (CN) .......................... 201811565963.0

(51) Int. Cl.
*H04N 21/439* (2011.01)
*H04N 21/442* (2011.01)
(Continued)

(52) U.S. Cl.
CPC ........... *H04N 21/439* (2013.01); *G06F 3/165* (2013.01); *H04N 21/4126* (2013.01);
(Continued)

(58) Field of Classification Search
CPC ............ H04N 21/439; H04N 21/4126; H04N 21/4222; H04N 21/43637; H04N 7/173; H04N 5/76; G06F 3/165
See application file for complete search history.

(56) References Cited

U.S. PATENT DOCUMENTS 10,037,761 B1 7/2018 Park
10,080,061 B1 * 9/2018 Kirley ................ H04N 21/4302
(Continued)

FOREIGN PATENT DOCUMENTS

CN 102800324 A 11/2012
CN 102867402 A 1/2013
(Continued)

OTHER PUBLICATIONS

International Search Report from PCT Application No. PCT/CN2019/104971 dated Dec. 24, 2019 (4 pages).
(Continued)

*Primary Examiner* — Ngoc K Vu
(74) *Attorney, Agent, or Firm* — Harness, Dickey & Pierce, P.L.C.

(57) ABSTRACT

The present disclosure provides audio playing and transmitting methods and apparatuses, so as to reduce a playback delay of a control apparatus. An audio playing method provided the embodiment of the present disclosure includes: receiving a first system time data packet transmitted from a smart television, wherein the first system time data packet includes a first system time of the smart television at a sound transmission start time; calculating a difference serving as a first difference between a current second system time of a control apparatus and the first system time; receiving audio data transmitted from the smart television; calculating, according to the first difference, a network delay of transmission of the audio data between the smart television and
(Continued)

the control apparatus; and abandoning the audio data when the network delay is greater than a preset threshold.

17 Claims, 12 Drawing Sheets

(51) Int. Cl.
    *H04N 21/488*     (2011.01)
    *H04N 21/422*     (2011.01)
    *H04N 21/4363*     (2011.01)
    *H04N 21/41*     (2011.01)
    *G06F 3/16*     (2006.01)

(52) U.S. Cl.
    CPC ... *H04N 21/4222* (2013.01); *H04N 21/43637* (2013.01); *H04N 21/44209* (2013.01); *H04N 21/4882* (2013.01)

(56) References Cited

U.S. PATENT DOCUMENTS

| | | | | |
|---|---|---|---|---|
| 2009/0288132 | A1* | 11/2009 | Hegde | H04N 21/4316 725/141 |
| 2012/0206650 | A1 | 8/2012 | Lin | |
| 2013/0086620 | A1* | 4/2013 | Araki | H04N 21/4302 725/116 |
| 2014/0177864 | A1 | 6/2014 | Kidron | |
| 2016/0255392 | A1* | 9/2016 | Li | H04N 21/42225 725/116 |
| 2017/0006331 | A1* | 1/2017 | Rath | H04N 21/4344 |
| 2018/0077443 | A1* | 3/2018 | Lau | H04N 21/4126 |

FOREIGN PATENT DOCUMENTS

| | | |
|---|---|---|
| CN | 102971788 A | 3/2013 |
| CN | 103297824 A | 9/2013 |
| CN | 103491445 A | 1/2014 |
| CN | 103888818 A | 6/2014 |
| CN | 105430436 A | 3/2016 |
| CN | 105992025 A | 10/2016 |
| CN | 105992040 A | 10/2016 |
| CN | 106454453 A | 2/2017 |
| CN | 106789886 A | 5/2017 |
| CN | 106792073 A | 5/2017 |
| CN | 106935253 A | 7/2017 |
| CN | 106936847 A | 7/2017 |
| CN | 107182009 A | 9/2017 |
| CN | 108184164 A | 6/2018 |
| CN | 109495776 A | 3/2019 |
| EP | 2043372 A1 | 4/2009 |
| JP | 2005184383 A | 7/2005 |

OTHER PUBLICATIONS

International Search Report from PCT Application No. PCT/CN2019/107265 dated Dec. 10, 2019 (4 pages).
Office Action from Chinese Application No. 201811565526.9 dated Feb. 20, 2021 (10 pages).
Office Action from Chinese Application No. 201811565963.0 dated Feb. 3, 2021 (7 pages).
Office Action from Chinese Application No. 201811565099.4 dated Jul. 1, 2020 (7 pages).

* cited by examiner

AUDIO PLAYING AND TRANSMITTING METHODS AND APPARATUSES

CROSS-REFERENCE TO RELATED APPLICATIONS

This application is a continuation of International Application No. PCT/CN2019/104971 filed Sep. 9, 2019, which claims the benefit and priority of Chinese Patent Application No. 201811565526.9 filed Dec. 20, 2018, Chinese Patent Application No. 201811565099.4 filed Dec. 20, 2018, and Chinese Patent Application No. 201811565963.0 filed Dec. 20, 2018 The entire disclosures of the above applications are incorporated herein by reference.

FIELD

The present disclosure relates to smart devices, and particularly relates to audio playing and transmitting methods and apparatuses.

BACKGROUND

This section provides background information related to the present disclosure which is not necessarily prior art.

With the continuous development of television technologies, TV products are increasingly recognized and used by users. On some occasions, many users often turn the TV to silent or turn down the TV sound when watching TV programs in order to avoid the influence on the rest of family members, which in some extent affects the TV program watching experience negatively.

SUMMARY

This section provides a general summary of the disclosure, and is not a comprehensive disclosure of its full scope or all of its features.

The embodiments of the present disclosure provide audio playing and transmitting methods and apparatuses.

In some embodiments of the present disclosure, an audio playing method, including:

receiving, by a control apparatus, a first system time data packet transmitted from a smart TV, wherein the first system time data packet includes a first system time of the smart TV at which the smart TV transmits the first system time data packet to the control apparatus;

calculating, by the control apparatus, a difference between a second system time of the control apparatus at which the control apparatus receives the first system time data packet and the first system time as a first difference;

receiving, by the control apparatus, audio data transmitted from the smart TV;

calculating, by the control apparatus, a network delay of transmission of the audio data between the smart TV and the control apparatus according to the first difference; and abandoning, by the control apparatus, the audio data in response to the network delay being greater than a preset threshold.

In some embodiments, said calculating the network delay of transmission of the audio data between the smart TV and the control apparatus according to the first difference includes:

obtaining, by the control apparatus, a third system time by parsing the audio data, wherein the third system time is a system time of the smart TV at which the smart TV transmits the audio data;

acquiring, by the control apparatus, a fourth system time, wherein the fourth system time is a system time at which the control apparatus receives the audio data;

calculating, by the control apparatus, a difference between the fourth system time and the third system time as a second difference; and determining, by the control apparatus, a difference between the second difference and the first difference as the network delay of transmission of the audio data between the smart TV and the control apparatus.

In some embodiments, the method further includes:

transmitting, by the control apparatus, a command for audio data transmission to the smart television, wherein the command is configured to cause the smart television to perform at least one of the following: transmitting audio data of a program being played to the control apparatus, turning off a device speaker of the smart television, or setting the volume output of the smart television to be 0.

In some embodiments, the method further includes:

receiving, by the control apparatus, a command for initiating an application for remote control of the smart television; and presenting, by the control apparatus, a first user interface for controlling the smart television in response to the command;

wherein the first user interface comprises a main control area and a function selection area; wherein the main control area comprises a volume control area and a program switching area; wherein the function selection area comprises at least one of the following: a sound transmission tab, a homepage tab configured to return to a remote controller homepage, or a keyboard tab configured to invoke a digital keyboard.

In some embodiments, the method further includes:

receiving, by the control apparatus, a selection for the sound transmission tab; and presenting, by the control apparatus, a second user interface in response to the selection for the sound transmission tab;

wherein the second user interface displays prompt information indicating that a sound playing device is the smart television, and a sound transmission switching option configured for switching the sound playing device between the smart television and the control apparatus.

In some embodiments, the method further includes:

receiving, by the control apparatus, a command for selecting the sound transmission switching option;

switching, by the control apparatus, the sound playing device from the smart TV to the control apparatus; and presenting, by the control apparatus, a third user interface in response to the command for selecting the sound transmission switching option, wherein the third user interface displays prompt information indicating that the sound playing device is the control apparatus.

In some embodiments, the method further includes:

transmitting, by the control apparatus, the received audio data to an audio player of the control apparatus upon the sound playing device being switched from the smart television to the control apparatus.

In some embodiments, the method further includes:

receiving, by the control apparatus, a command for closing the sound transmission switching option; and transmitting, by the control apparatus, a command for stopping sound recording to the smart TV in response to the command for closing the sound transmission switching option.

In some embodiments, the method further includes:

establishing, by the control apparatus, communication connection with the smart TV before receiving the command for initiating the application for remote control of the smart TV.

In the embodiments of the present disclosure, an audio transmitting method, including:

transmitting, by a smart TV, a first system time data packet to a control apparatus, wherein the first system time data packet includes a first system time of the smart TV at which the smart TV transmits the first system time data packet to the control apparatus;

receiving, by a smart TV, a command for audio data transmission transmitted from a control apparatus; and transmitting, by a smart TV, an audio data to the control apparatus, wherein the audio data includes a second system time of the smart TV at which the smart TV transmits the audio data, such that the control apparatus calculates a network delay of transmission of the audio data between the smart TV and the control apparatus and determines whether to play the audio data according to the network delay.

In the embodiment of the present disclosure, a control apparatus, including:

a memory, configured to store computer readable program codes; and a processor, configured to execute the computer readable program codes to control the control apparatus to:

receive a first system time data packet transmitted from a smart TV, wherein the first system time data packet includes a first system time of the smart TV at which the smart TV transmits the first system time data packet to the control apparatus;

calculate a difference between a second system time of the control apparatus at which the control apparatus receives the first system time data packet and the first system time as a first difference;

receive audio data transmitted from the smart TV;

calculate a network delay of transmission of the audio data between the smart TV and the control apparatus according to the first difference; and abandon the audio data in response to the network delay being greater than a preset threshold.

In some embodiments, the processor is further configured to execute the computer readable program codes to control the control apparatus to:

obtain a third system time included in the audio data by parsing the audio data, wherein the third system time is a system time of the smart TV at which the smart TV transmits the audio data;

acquire a fourth system time, wherein the fourth system time is a system time at which the control apparatus receives the audio data;

calculate a difference between the fourth system time and the third system time as a second difference; and determine a difference between the second difference and the first difference as the network delay of transmission of the audio data between the smart TV and the control apparatus.

In some embodiments, the processor is further configured to execute the computer readable program codes to control the control apparatus to:

transmit a command for audio data transmission to the smart TV, wherein the command for audio data transmission is configured to cause the smart TV to perform at least one of the following: transmitting audio data of a program being played to the control apparatus, turning off a device speaker of the smart television, or setting the volume output of the smart TV to be 0.

In some embodiments, the processor is further configured to execute the computer readable program codes to control the control apparatus to:

receive a command for initiating an application for remote control of the smart TV; and present a first user interface for controlling the smart TV in response to the command;

wherein the first user interface includes a main control area and a function selection area; wherein the main control area includes a volume control area and a program switching area; wherein the function selection area includes at least one of the following: a sound transmission tab, a homepage tab configured to return to a remote controller homepage, or a keyboard tab configured to invoke a digital keyboard.

In some embodiments, the processor is further configured to execute the computer readable program codes to control the control apparatus to:

receive a selection for the sound transmission tab; and present a second user interface in response to the selection for the sound transmission tab;

wherein the second user interface displays prompt information indicating that a sound playing device is the smart TV, and a sound transmission switching option configured for switching the sound playing device between the smart television and the control apparatus.

In some embodiments, the processor is further configured to execute the computer readable program codes to control the control apparatus to:

receive a command for selecting the sound transmission switching option;

switch the sound playing device from the smart TV to the control apparatus; and present a third user interface in response to the command for selecting the sound transmission switching option; wherein the third user interface displays prompt information indicating that the sound playing device is the control apparatus.

In some embodiments, the processor is further configured to execute the computer readable program codes to control the control apparatus to:

transmit the received audio data to an audio player of the control apparatus upon the sound playing device being switched from the smart TV to the control apparatus.

In some embodiments, the processor is further configured to execute the computer readable program codes to control the control apparatus to:

receive a command for closing the sound transmission switching option; and transmit a command for stopping sound recording to the smart TV in response to the command for closing the sound transmission switching option.

In some embodiments, the processor is further configured to execute the computer readable program codes to control the control apparatus to:

establish communication connection with the smart TV before receiving the command for initiating the application for remote control of the smart television.

In the embodiment of the present disclosure, a smart TV, including:

a memory, configured to store computer readable program codes; and a processor, configured to execute the computer readable program codes to control the smart TV to:

transmit a first system time data packet to a control apparatus, wherein the first system time data packet includes a first system time of the smart TV at which the smart TV transmits the first system time data packet to the control apparatus;

receive a command for audio data transmission transmitted from a control apparatus; and transmit an audio data to the control apparatus, wherein the audio data includes a second system time of the smart TV at which the smart TV transmits the audio data, such that the control apparatus calculates a network delay of transmission of the audio data between the smart TV and the control apparatus and determines whether to play the audio data according to the network delay.

In the embodiments of the present disclosure, a machine-readable non-volatile storage medium, wherein the machine-readable non-volatile storage medium stores computer readable program codes, and the computer readable program codes is executed to:

receive a first system time data packet transmitted from a smart TV, wherein the first system time data packet includes a first system time of the smart TV at which the smart TV transmits the first system time data packet to the control apparatus;

calculate a difference between a second system time of the control apparatus at which the control apparatus receives the first system time data packet and the first system time as a first difference;

receive audio data transmitted from the smart TV;

calculate a network delay of transmission of the audio data between the smart TV and the control apparatus according to the first difference; and abandon the audio data in response to the network delay being greater than a preset threshold.

In the embodiments of the present disclosure, an audio playing apparatus, including:

a first unit, configured to receive a first system time data packet transmitted from a smart TV, wherein the first system time data packet includes a first system time of the smart TV at which the smart TV transmits the first system time data packet to the audio playing apparatus;

a second unit, configured to calculate a difference between a second system time of the audio playing apparatus at which the audio playing apparatus receives the first system time data packet and the first system time as a first difference;

a third unit, configured to transmit a command for audio data transmission to a smart TV;

a fourth unit, configured to receive audio data transmitted from the smart TV;

a fifth unit, configured to calculate a network delay of transmission of the audio data between the smart TV and the audio playing apparatus according to the first difference; and a sixth unit, configured to abandon the audio data in response to the network delay being greater than a preset threshold.

In the embodiment of the present disclosure provides a smart TV, including:

a first transmitting unit, configured to transmit a first system time data packet to a control apparatus, wherein the first system time data packet includes a first system time of the smart TV at which the smart TV transmits the first system time data packet to the control apparatus;

a receiving unit, configured to receive a command for audio data transmission transmitted from a control apparatus;

a second transmitting unit, configured to transmit an audio data to the control apparatus, wherein the audio data includes a second system time of the smart TV at which the smart TV transmits the audio data, such that the control apparatus calculates a network delay of transmission of the audio data between the smart TV and the control apparatus and determines whether to play the audio data according to the network delay.

In the embodiments of the present disclosure, an audio transmitting method, including:

acquiring, by a smart TV, audio data currently played.

adding, the smart TV, invalid audio data instruction information into the audio data if the audio data are invalid audio data, and compresses the audio data to generate an invalid audio data packet;

transmitting, the smart TV, the invalid audio data packet to the control apparatus.

In some embodiments, the method further includes: transmitting the valid audio data to the control apparatus if the audio data are valid audio data.

In some embodiments, the step of adding, the smart TV, invalid audio data instruction information into the audio data if the audio data are invalid audio data, and compresses the audio data to generate an invalid audio data packet further includes:

determining whether all the audio data are invalid bytes is determine;

adding the invalid audio data instruction information into the invalid bytes if all the audio data are the invalid bytes; and compressing the invalid audio data to generate the invalid audio data packet.

In some embodiments, the method further includes: determining the audio data as the invalid audio data if the acquired audio data are a complete frame of audio data and characters of the frame of audio data are preset characters.

In some embodiments, the method further includes:

controlling the smart TV to enter a recording state to perform audio recording on smart TV before the step of acquiring audio data currently played. In the embodiments of the present disclosure, an audio playing method, including:

receiving, by a control apparatus, audio data transmitted from the smart TV;

parsing, by a control apparatus, the audio data, and abandoning invalid audio data if the audio data are the invalid audio data.

In some embodiments, the method further includes: playing the audio data when the audio data are valid audio data.

In some embodiments, the method further includes: determining whether the audio data are invalid audio data according to instruction information in the audio data after the audio data sent by the smart TV are received.

In some embodiments, the method further includes: setting the instruction information located on the previous N bytes of the audio data, and N is a natural number.

In some embodiments, the method further includes: storing the valid audio data into a playback cache when the audio data are determined as the valid audio data.

In the embodiment of the present disclosure, a smart TV, including:

a receiving unit, configured to receive a command for audio data transmission transmitted from a control apparatus;

an acquisition unit, configured to acquire audio data currently played;

a processing unit, configured to add invalid audio data instruction information into the audio data if the audio data are invalid audio data, and compress the audio data to generate an invalid audio data packet;

a transmitting unit, configured to transmit the invalid audio data packet to a control apparatus.

In the embodiments of the present disclosure, a control apparatus, including:

a receiving unit, configured to receive audio data transmitted from the smart TV;

a processing unit, configured to parse the audio data, and abandon invalid audio data if the audio data are invalid audio data; and a playing unit, configured to play the audio data when the audio data are valid audio data.

In the embodiment of the present disclosure, a computing device, including:

a memory, configured to store computer readable program codes; and a processor, configured to execute the computer readable program codes to perform at least one of the above methods.

In the embodiments of the present disclosure, a computer-readable non-volatile storage medium, which stores computer readable program codes, and the computer readable program codes is executed by a computer to implement at least one of the above methods.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. FIG. 1 is a schematic diagram of an interaction example of a smart TV and a control apparatus according to some embodiments of the present disclosure.

Corresponding reference numerals indicate corresponding parts or features throughout the several views of the drawings.

DETAILED DESCRIPTION

Figure 1:
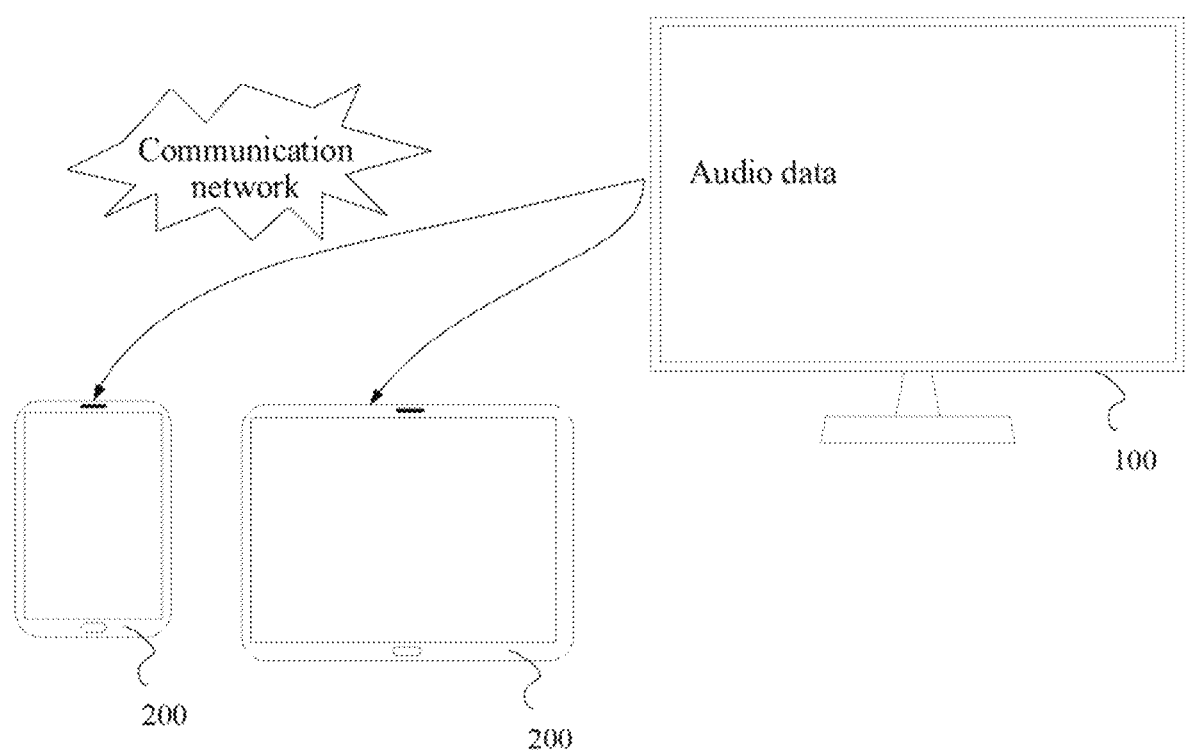

Example embodiments will now be described more fully with reference to the accompanying drawings.

A mobile device is used as a sound output device of a smart television (smart TV), and a television side captures a current sound in real time and transmits it to the mobile device for real-time playback. However, after the TV is connected to a mobile phone, the sound may be delayed due to network reasons and a situation that a playback cache of the mobile phone cannot be cleaned up in time.

The embodiments of the present disclosure will be described clearly and fully below in combination with the drawings in the embodiments of the present disclosure. Obviously, the embodiments described herein are only part of the embodiments of the present disclosure, not all the embodiments. Based on the embodiments in the present disclosure, all other embodiments obtained by those of ordinary skill in the art without creative work shall fall within the protection scope of the present disclosure.

Embodiments of the present disclosure provide audio playing and transmitting methods and apparatuses. Audio data with a long delay time are abandoned at a control apparatus to reduce playback cache, thereby reducing playback delay and avoiding the phenomenon that the control apparatus and a smart TV may not synchronize audio data in real time due to a relatively large network delay.

The embodiments of the present disclosure are described in detail below with reference to the drawings of the description. It should be noted that the order of presentation of the embodiments of the present disclosure is merely representative of the order of the embodiments, and does not represent the advantages and disadvantages of the technical solutions provided by the embodiments.

In the following descriptions, a lot of specific details are described to provide better illustrations of the embodiments of the present disclosure. However, it is apparent for those skilled in the art that these specific details may not be used during implementation of the embodiments of the present disclosure.

The term "live television" used in the present disclosure refers to real-time television production broadcasting or television production broadcasting basically synchronized with an event occurrence moment.

The term "Video on Demand" (VOD) used in the present disclosure refers to a system and process for allowing a user to select and watch/listen contents of videos or audios on demand. A VOD system may present content in categories, so that the content can be watched in real time or the content can be downloaded to a storage medium for watching later.

The terms "determine", "calculate" and "computer calculation" and variations thereof which are used in the present disclosure may be used interchangeably, and include any types of methodologies, processes, arithmetical operations or skills.

Embodiments of the present disclosure provide an application scene of interaction between a smart TV, and a control apparatus, such as a mobile device.

Referring to a smart TV 100 as shown in FIG. 1 according to some embodiments, the smart TV 100 may be configured with functions including entertainment, commercial application, social interaction, content establishment and/or consumption, and one or more control apparatuses is configured to organize and control communication with the smart TV 100. Therefore, it can be understood that the smart TV and/or the control apparatus may be used for enhancing the user interaction experience, either at home or in a work place.

In some embodiments, the smart TV 100 may be configured to receive and process various user and/or device inputs. The smart TV 100 may be controlled with a mobile device such as a mobile phone, a tablet computer, a computer, a notebook computer, a netbook and other smart devices. For example, the smart TV 100 is controlled by an application running on a smart device.

In some embodiments, the smart TV 100 may be configured to receive inputs, including, but not limited to, a video, an audio, a radio, light, tactility and a combination thereof, through various input devices. For example, a user can talk to the smart TV 100 by conversation. The smart TV 100 is like a smart personal assistant for smart devices and a voice-activated navigation application (such as Siri of Apple, Skyvi of Android, Robin, Iris, and other application) to receive and process voice commands.

The embodiments of the present disclosure provide operation steps of a mobile device for a user interface for interacting with a user.

Figure 2:
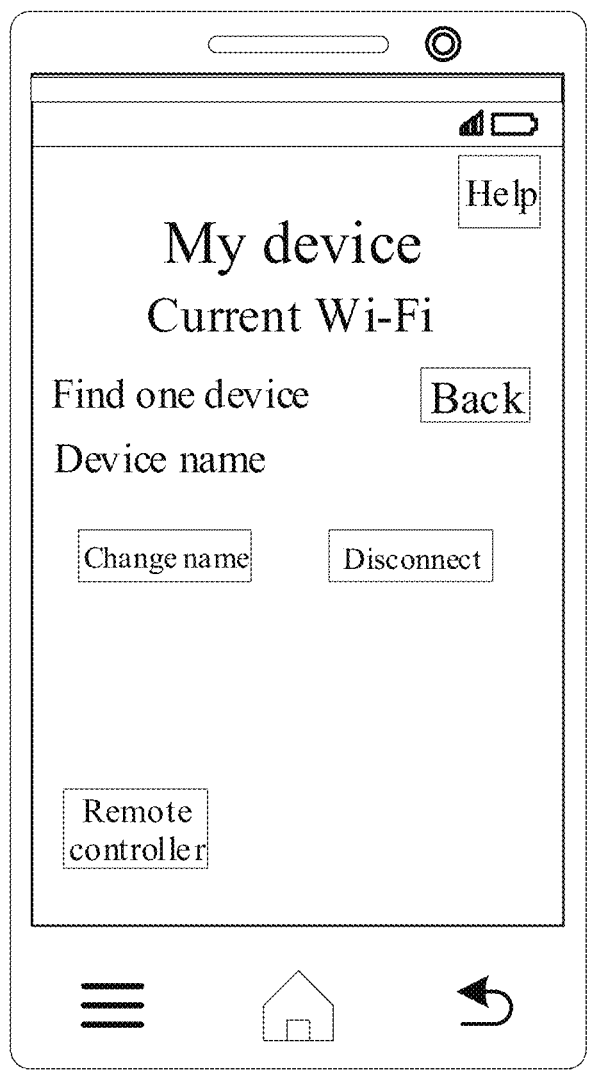
FIG. 2 is a schematic diagram of a connection state of a mobile device and a smart TV according to some embodiments of the present disclosure.

As shown in FIG. 2, the embodiments of the present disclosure provide a schematic diagram of a connection state between a mobile device and a smart TV. When the smart TV interacts with the mobile device, the mobile device may establish communication connection with the smart TV according to various connection protocols. Furthermore, the mobile device may remotely control the smart TV, or is provided with an application for operating and controlling the smart TV.

Figure 3:
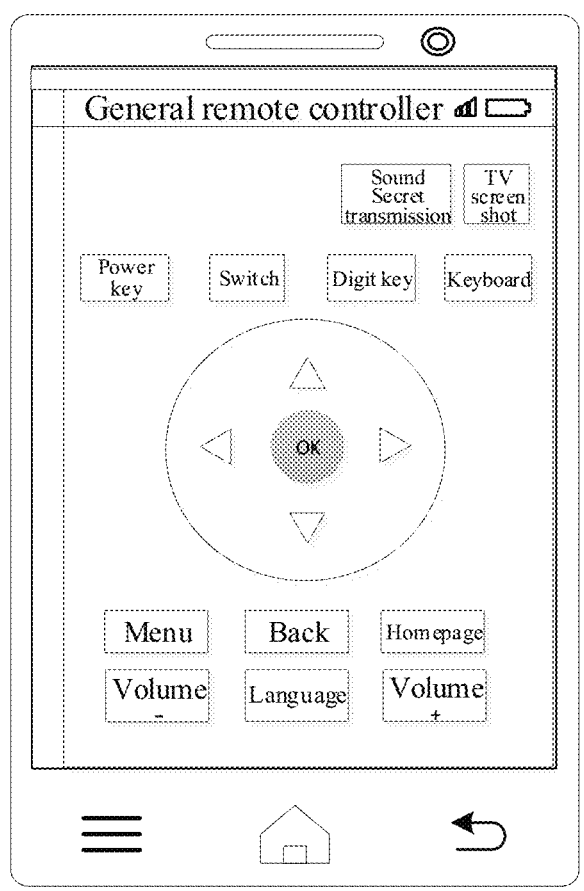
FIG. 3 is a schematic diagram of a first user interface of a mobile device according to some embodiments of the present disclosure.

As shown in FIG. 3, when the mobile device receives a command for initiating an application for remote control of the smart TV, the mobile device may initiate the application for remote control and present a first user interface for controlling the smart TV. The first user interface includes a main control area and a function selection area; wherein the main control area includes a volume control area and a program switching area; wherein the function selection area includes at least one of the following: a tab for indicating sound transmission, a homepage tab configured to return to a remote controller homepage, or a keyboard tab configured to invoke a digital keyboard. The mobile device may perform operations on the first user interface to realize the interaction with the smart TV. For example, when a user inputs a command at the volume control area, a volume output of the smart TV may be controlled.

Figure 4:
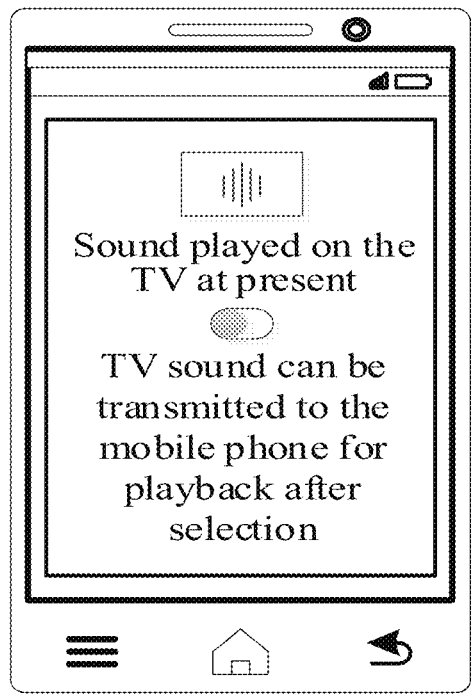
FIG. 4 is a schematic diagram of a second user interface of a mobile device according to some embodiments of the present disclosure.

As shown in FIG. 4, in response to a selection for the sound transmission tab received by the mobile device, the mobile device presents a second user interface. The second user interface displays prompt information indicating that a sound playing device is the smart TV, and a sound transmission switching option configured for switching the sound playing device between the smart television and the control apparatus.

Figure 5:
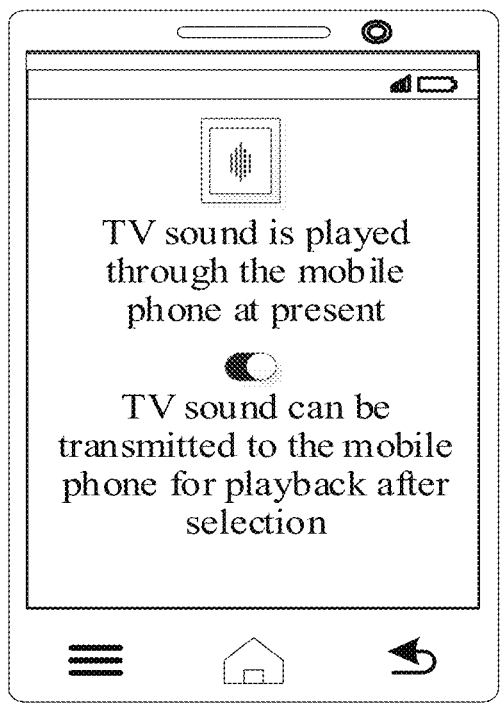
FIG. 5 is a schematic diagram of a third user interface of a mobile device according to some embodiments of the present disclosure.

As shown in FIG. 5, in response to a command for selecting the sound transmission switching option bar received by the mobile device, the mobile device presents a third user interface, the sound playing device is switched from the smart TV to a mobile device. The third user interface displays prompt information indicating that the sound playing device is the mobile device. In the sound transmission switching process, the smart TV turns the volume of an audio player thereof to silent or 0, so that the audio data are still played in the audio player, but are not output from a speaker, and the audio data are acquired and recorded by the smart TV, and then are transmitted to the mobile device.

Upon the smart TV receiving a command for audio data transmission from the mobile device, the acquired audio data are encoded into a Pulse Code Modulation (PCM) data stream which is transmitted to the mobile device through a network. The mobile device plays a TV sound in real time. Since the audio data stream is original PCM data, no decoding processing needs to be performed by the mobile device the data is directly transmitted into a hardware decoder for decoding playback by the mobile device each time the mobile device receives a frame of data.

In a smart TV system based on Linux or Android system, an audio capturing and encoding function provided by a Central Processing Unit (CPU) of the entire smart TV is used to capture a sound of the current screen of the smart TV according to a certain sampling format (e.g. 8 KHz sampling rate, 16 Bit sampling precision, and dual track) to provide audio data in a PCM format, and to transmit the non-compressed data to a mobile device through a wired network or a wireless network. The mobile device directly transmits the audio data to the hardware decoder for decoding playback upon receiving the audio data.

Figure 6:
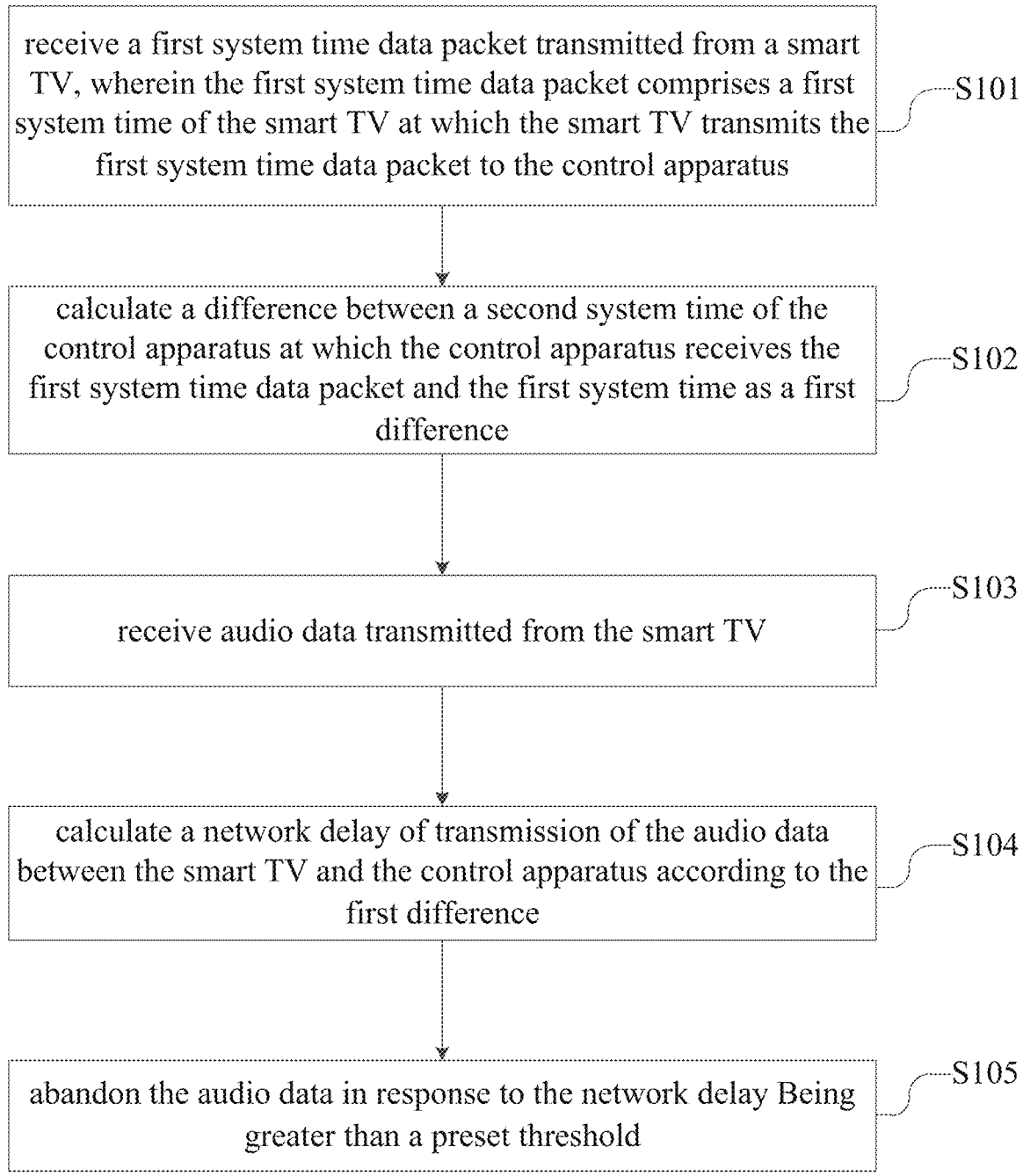
FIG. 6 is a first schematic diagram of an audio playing method according to some embodiments of the present disclosure.

Referring to FIG. 6, in the embodiments of the present disclosure, an audio playing method which is performed by a control apparatus, includes the following steps.

Step S101 is to receive a first system time data packet from a smart TV, wherein the first system time data packet includes a first system time of the smart TV at which the smart TV transmits the first system time data packet to the control apparatus. For example, the control apparatus is the mobile device.

Step S102 is to calculate a difference between a second system time of the control apparatus at which the control apparatus receives the first system time data packet and the first system time as a first difference.

Step S103 is to receive audio data transmitted from the smart TV.

Step S104 is to calculate a network delay of transmission of the audio data between the smart TV and the control apparatus according to the first difference.

Step S105 is to abandon the audio data in response to the network delay being greater than a preset threshold.

Through the method above, the playback delay of the audio data receiving end is reduced.

For example, the preset threshold may be 200 ms. When the network delay is more than 200 ms, the audio data are abandoned and not transmitted into the audio player of the mobile device for playback (it is not necessary to play audio data with a relatively large delay); and when the network delay is less than or equal to the preset threshold, the audio data are transmitted into the audio player of the mobile device for playback. The mobile device may be a mobile phone. Before playing the audio data, the mobile phone may place the audio data received by the upper layer into a cache queue, and an audio player of the mobile phone reads the audio data from the cache queue during playing. After the playing is completed, the played audio data may be deleted from the cache queue. If an upper-layer application writes data into the cache queue too fast, and the player reads the data from the cache queue slowly, more and more data will be cached in this queue.

For example, the control apparatus is a mobile phone; the first system time is system time Time1_tv of the smart TV; and the second system time is system time Time1_phone of the mobile phone. The first difference Time_systemDiff is calculated in the formula: Time_systemDiff=Time1_phone−Time1_tv. The first system time and the second system time may be different. One reason is that the time on the smart TV is not synchronized with the network (for example, a router is not connected to an extranet), and the time on the mobile phone is synchronized with the network. Another reason is that the smart TV and the mobile phone are both synchronized with the network in time, but the synchronized time of the smart TV and the synchronized time of the mobile phone are not completely the same and may have an error ranging from several milliseconds to several hundred of milliseconds, and even about 1 s.

In some embodiments, step S104 further includes that:

the control apparatus obtains a third system time by parsing the audio data, wherein the third system time is a system time of the smart TV at which the smart TV transmits the audio data;

the control apparatus acquires a fourth system time, wherein the fourth system time is a system time at which the control apparatus receives the audio data;

the control apparatus calculates a difference between the fourth system time and the third system time as a second difference; and the control apparatus determines a difference between the second difference and the first difference as the network delay of transmission of the audio data between the smart TV and the control apparatus.

For example, the third system time is system time Time2_tv of the TV; and the fourth system time is system time Time2_phone of the mobile phone.

The second difference Time_netDiff is calculated in the formula:

Time_netDiff=Time2_phone−Time2_tv.

The network delay Time_delay is calculated in the formula:

Time_delay=Time_netDiff−Time_systemDiff.

Wherein (Time2_phone−Time2_tv) refers to the network delay of the transmission of the audio data from the smart TV to the mobile phone and a system time difference between the smart TV and the mobile phone, and (Time1_phone−Time1_tv) refers to a system time difference between the smart TV and the mobile phone (since a data volume transmitted from the smart TV to the mobile phone only has a time point and no audio data, the network delay in the transmission process is very small and may be omitted); and (Time_netDiff−Time_systemDiff) refers to the network delay of the transmission of the audio data from the smart TV to the mobile phone.

In some embodiments, the method further includes: the control apparatus transmits a command for audio data transmission to the smart TV, wherein the command for audio data transmission is configured to cause the smart TV to perform at least one of the following: transmit audio data of a program being played to the control apparatus, turn off a device speaker of the smart television, or set the volume output of the smart TV to be 0.

In some embodiments, the method further includes: the control apparatus receives a command for initiating an application for remote control of the smart TV, and presents a first user interface for controlling the smart TV in response to the command for initiating the application; wherein the first user interface includes a main control area and a function selection area; wherein the main control area includes a volume control area and a program switching area; wherein the function selection area includes at least one of the following: a tab for sound transmission, a homepage tab for indicating returning to a remote controller homepage, or a keyboard tab for indicating invoking a digital keyboard.

In some embodiments, the method further includes: in response to a selection for the sound transmission tab received by the control apparatus, the control apparatus presents a second user interface; wherein the second user interface displays prompt information for indicating that a sound playing device is the smart TV, and a sound transmission switching option for indicating switching the sound playing device between the smart TV and the control apparatus.

In some embodiments, the method further includes: in response to a command for selecting the option for switching sound transmission received by the control apparatus, the control apparatus presents a third user interface and switches the sound playing device from the smart TV to the control apparatus; wherein the third user interface displays prompt information indicating that the sound playing device is the control apparatus.

In some embodiments, the method further includes: the control apparatus transmits the received audio data to an audio player of the control apparatus upon the sound playing device being switched from the smart TV to the control apparatus.

In some embodiments, the method further includes: in response to a command for closing the option for switching sound transmission received by the control apparatus, the control apparatus transmits a command for stopping sound recording to the smart TV.

In some embodiments, the method further includes: the control apparatus establishes communication connection with the smart TV before receiving the command for initiating the application for remote control of the smart TV.

Figure 7:
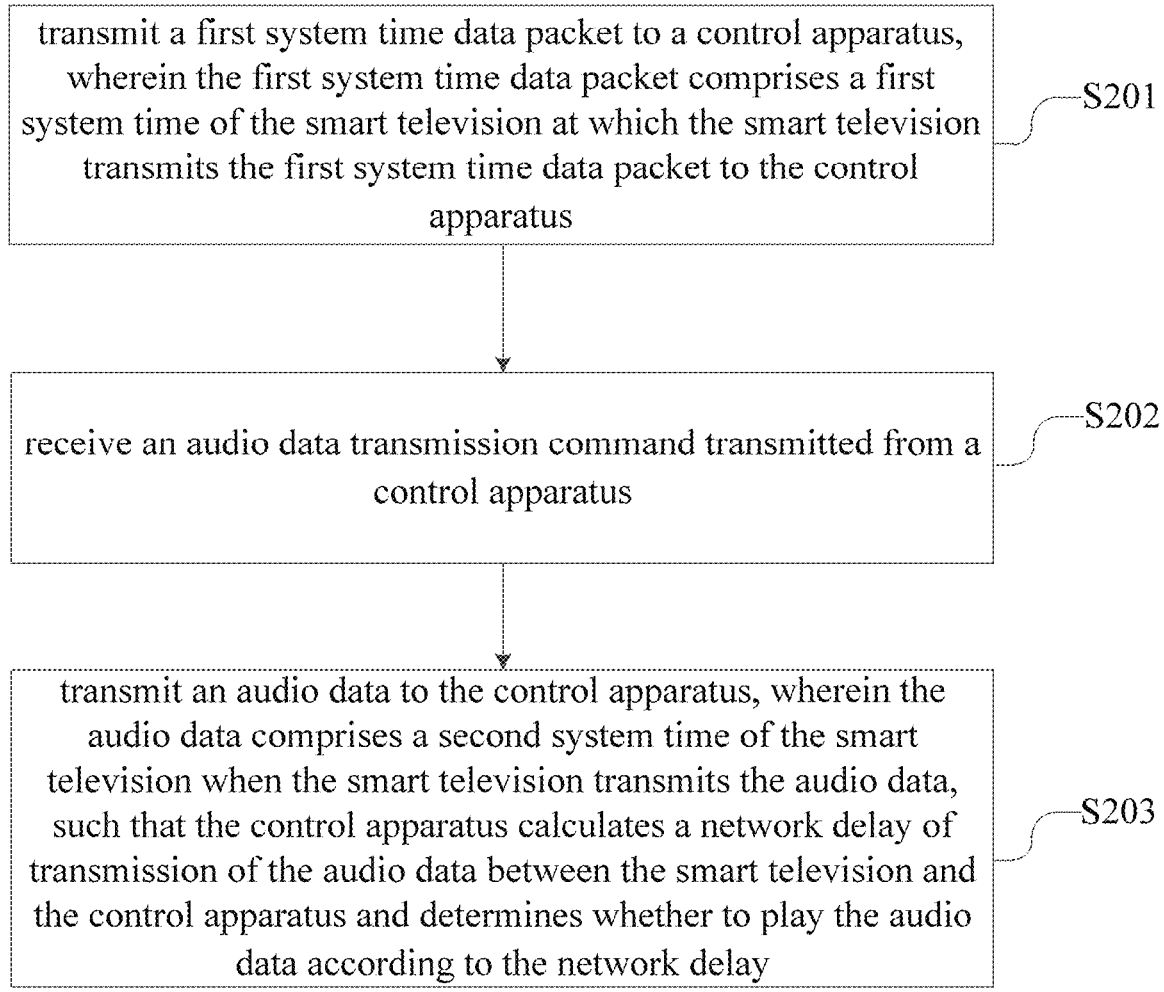
FIG. 7 is a first schematic diagram of an audio transmitting method according to some embodiments of the present disclosure.

Referring to FIG. 7, in the embodiments of the present disclosure, an audio transmitting method, which is performed by a smart TV, includes the following steps.

Step S201 is to transmit a first system time data packet to a control apparatus, wherein the first system time data packet includes a first system time of the smart TV at which the smart TV transmits the first system time data packet to the control apparatus.

The control apparatus may be the mobile phone mentioned above.

Step S202 is to receive a command for audio data transmission transmitted from a control apparatus.

Step S203 is to transmit an audio data to the control apparatus, wherein the audio data includes a second system time of the smart TV when the smart TV transmits the audio data, such that the control apparatus calculates a network delay of transmission of the audio data between the smart TV and the control apparatus and determines whether to play the audio data according to the network delay.

Through the method, the playback delay of the control apparatus is reduced.

For example, before the smart TV transmitting the audio data in the PCM format to the mobile phone, current system time information (the smart TV) may be added in front of the audio data in the PCM format.

Figure 8:
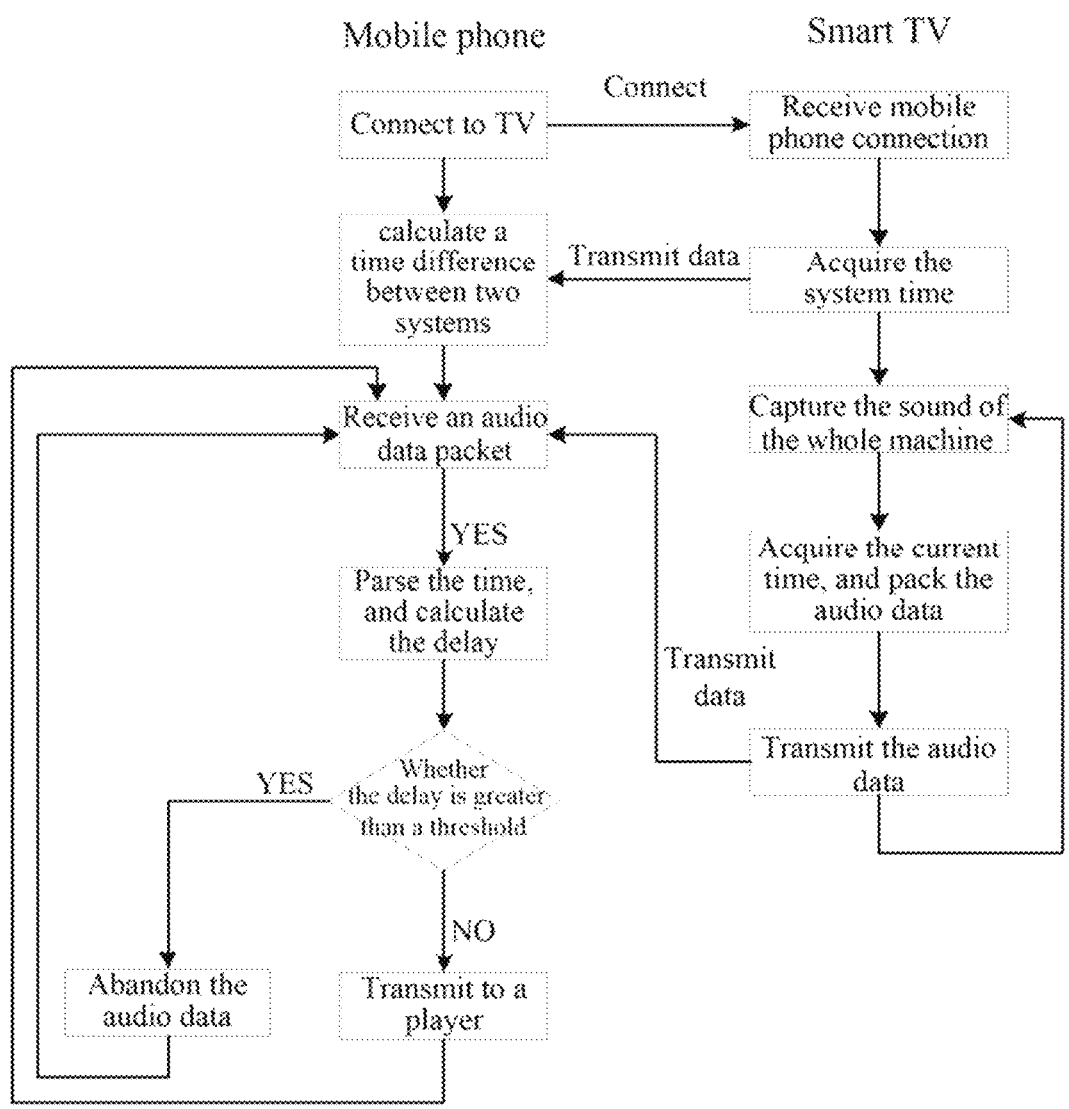
FIG. 8 is a first schematic diagram of an overall process of delay optimization according to some embodiments of the present disclosure.

Referring to FIG. 8, illustrating an overview flowchart of delay optimization according to some embodiments of the present disclosure, the main specific processing flow of the smart TV and the mobile phone is as follows.

The smart TV acquires the current system time Time1_tv of the smart TV after the connection between the mobile phone and the smart TV is established, and transmits the system time Time1_tv to the mobile phone.

The mobile phone acquires the system time Time1_phone of the mobile phone when the system time Time1_tv is received by the mobile phone.

A system time difference Time_systemDiff between the mobile phone and the smart TV (for different devices such as the smart TV and phone, the system time of the mobile phone and the system time of the smart TV acquired at the same time may be different) is calculated according to the formula:

Time_systemDiff=Time1_phone−Time1_tv.

The smart TV acquires the system time Time2_tv when the audio data in the PCM format is captured by the smart TV each time, and then packs the audio data in the PCM format and the system time Time2_tv. The packing format is as shown in Table 1.

TABLE 1

| Audio data packet | |
| --- | --- |
| Time (length 8 Byte) | Audio data (length 640 Byte) |

A calculation method of the audio data includes the following.

It is assumed that an audio sampling rate is 8000 Hz, two sampling channels are provided, a bit depth is 16, and a sampling interval is 20 ms, so that the calculation formula (1) of an audio data size per frame is:

$$\frac{\text{Audio sampling rate} * \text{bit depth} * \text{sampling channel}}{8 * \text{sampling interval}} = 640\,(\text{Byte}) \quad (1)$$

The mobile phone receives the audio data packet, and then obtains the time Time2_tv by parsing the data packet. The mobile phone acquires the system time Time2_phone of the mobile phone at which the audio data packet is received by the mobile phone. Another system time difference Time_netDiff between the mobile phone and the smart TV is calculated in the formula: Time_netDiff=Time2_phone−Time2_tv.

A real network delay Time_delay is calculated according to a formula:

Time_delay=Time_netDiff−Time_systemDiff.

When the network delay Time_delay is greater than a preset threshold K which is, for example, 200 ms, the mobile phone abandons the audio data and does not transmit the data to its audio player (it does not make any sense to play audio data with a relatively large delay); and when the network delay is less than or equal to the preset threshold K, the mobile phone transmits the audio data into its audio player for playback.

Some embodiments according to the present disclosure is as follows, and the day Dec. 1, 2018 is taken as an example.

It is assumed that at the beginning of the transmission of the system time data packet, the system time Time1_tv of the smart TV is 11:11:11:100, and the system time Time1_phone of the mobile phone is 11:11:12:110, so that Time_systemDiff is 1.01 s according to the formula Time_systemDiff=Time1_phone−Time1_tv. That is, the system time of the mobile phone is 1.01 s earlier than the system time of the smart TV.

After 2 seconds, the smart TV starts to transmit the audio data to the mobile phone, and at the moment, the system time Time2_tv of the smart TV is 11:11:13:100, and the system time Time2_phone when the mobile phone receives the audio data is 11:11:14:210, so that the Time_netDiff is 1.11 s according to the formula Time_netDiff=Time2_phone−Time2_tv.

The Time_delay is 0.1 s according to the above formula Time_delay=Time_netDiff−Time_systemDiff.

Figure 9:
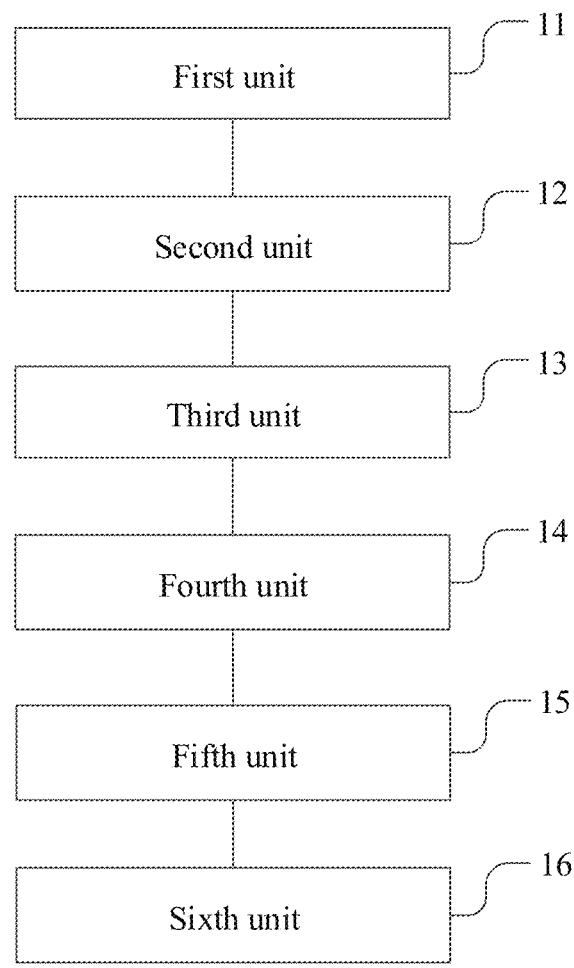
FIG. 9 is a schematic diagram of an audio playing apparatus according to some embodiments of the present disclosure.

The control apparatus above may be an audio playing apparatus. Referring to FIG. 9, in some embodiments of the present disclosure, the audio playing apparatus, including:

a first unit 11, configured to receive a first system time data packet transmitted from a smart TV, wherein the first system time data packet includes a first system time of the smart TV at which the smart TV transmits the first system time data packet to the audio playing apparatus;

a second unit 12, configured to calculate a difference between a second system time of the audio playing apparatus at which the audio playing apparatus receives the first system time data packet and the first system time as a first difference;

a third unit 13, configured to transmit a command for audio data transmission to a smart TV;

a fourth unit 14, configured to receive audio data transmitted from the smart TV;

a fifth unit 15, configured to calculate a network delay of transmission of the audio data between the smart TV and the audio playing apparatus according to the first difference; and a sixth unit 16, configured to abandon the audio data in response to the network delay being greater than a preset threshold.

Figure 10:
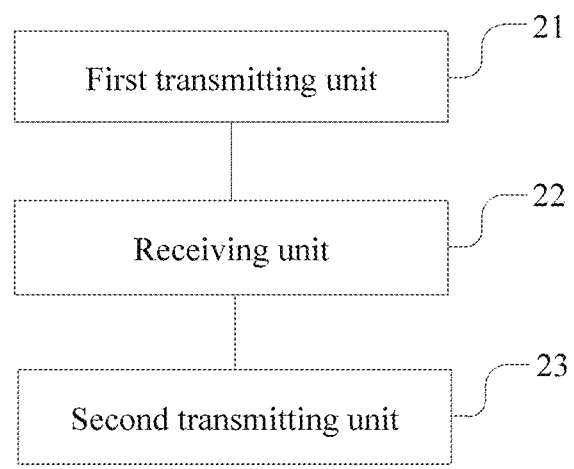
FIG. 10 is a first schematic diagram of a smart TV according to some embodiments of the present disclosure.

Referring to FIG. 10, in some embodiments of the present disclosure, the smart TV including:

a first transmitting unit 21, configured to transmit a first system time data packet to a control apparatus, wherein the first system time data packet includes a first system time of the smart TV at which the smart TV transmits the first system time data packet to the control apparatus;

a receiving unit 22, configured to receive a command for audio data transmission transmitted from a control apparatus;

a second transmitting unit 23, configured to transmit an audio data to the control apparatus, wherein the audio data includes a second system time of the smart TV at which the smart TV transmits the audio data, such that the control apparatus calculates a network delay of transmission of the audio data between the smart TV and the control apparatus and determines whether to play the audio data according to the network delay.

Figure 11:
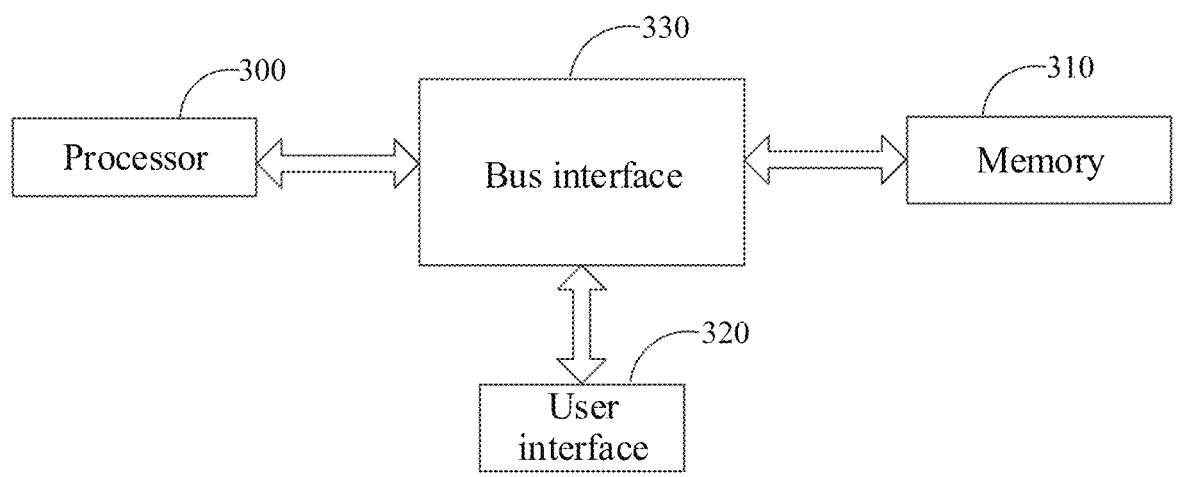
FIG. 11 is a first schematic diagram of a control apparatus according to some embodiments of the present disclosure.

Referring to FIG. 11, in some embodiments of the present disclosure also, a control apparatus, including:

a memory 310, configured to store computer readable program codes; and a processor 300, configured to execute the computer readable program codes to cause the control apparatus to:

receive a first system time data packet transmitted from a smart TV, wherein the first system time data packet includes a first system time of the smart TV at which the smart TV transmits the first system time data packet to the control apparatus;

calculate a difference between a second system time of the control apparatus at which the control apparatus receives the first system time data packet and the first system time as a first difference;

receive audio data transmitted from the smart TV;

calculate a network delay of transmission of the audio data between the smart TV and the control apparatus according to the first difference; and abandon the audio data in response to the network delay being greater than a preset threshold.

The audio data is abandoned if the network delay is greater than the preset threshold, so that the playback delay of the control apparatus is reduced.

The control device further includes a user interface 320 and a bus interface 330. The processor 300 is connected to the memory 310 via the bus interface 330, and the user interface 320 is connected to the bus interface 330.

In some embodiments, the processor 300 is further configured to execute the computer readable program codes to control the control apparatus to perform the audio playing method above.

Figure 12:
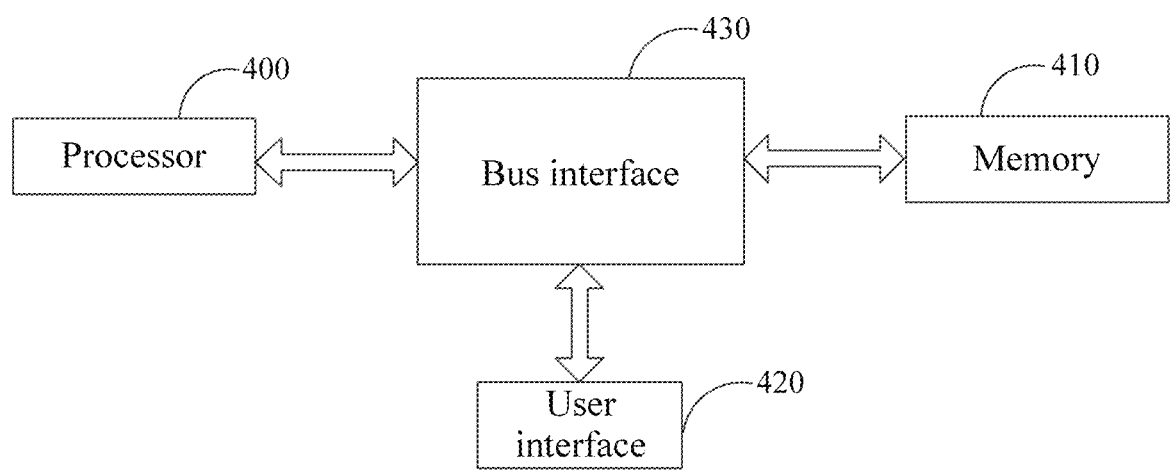
FIG. 12 is a second schematic diagram of a smart TV according to some embodiments of the present disclosure.

Referring to FIG. 12, in some embodiments of the present disclosure, a smart TV, includes:

a memory 410, configured to store computer readable program codes; and a processor 400, configured to execute the computer readable program codes to control the smart TV to:

transmit a first system time data packet to a control apparatus, wherein the first system time data packet includes a first system time of the smart TV at which the smart TV transmits the first system time data packet to the control apparatus;

receive a command for audio data transmission transmitted from a control apparatus; and transmit an audio data to the control apparatus, wherein the audio data includes a second system time of the smart TV at which the smart TV transmits the audio data, such that the control apparatus calculates a network delay of transmission of the audio data between the smart TV and the control apparatus and determines whether to play the audio data according to the network delay.

The control apparatus calculates the network delay of transmission of the audio data between the smart TV and the control apparatus and determines whether to play the audio data according to the network delay, thereby reducing the playback delay of the control apparatus.

The smart TV further includes a user interface 420 and a bus interface 430. The processor 400 is connected to the memory 410 via the bus interface 430, and the user interface 420 is connected to the bus interface 430.

In a real-time audio playing process, the smart TV continuously records sounds and transmits the recorded sounds to the mobile device through a network. The recorded sounds are subjected to "valid audio data frame" analysis before being transmitted from the smart TV, and "valid audio data" are transmitted in real time. If the smart TV does not play a sound or video file, a frame of sound recorded by the smart TV is continuous 0x00 (0x00 refers to a hexadecimal number, and 0x is the prefix of the hexadecimal number). For such an invalid data frame (null data) including all 0x00 data, a frame of network data is also occupied in a transmission process. After the mobile device receives the invalid data frame, the mobile device adds the invalid data frame into a cache of a player, which also increases the playback cache of the mobile phone. If this invalid data frame is specially processed (there is no sound when the 0x00 data are played with the player) and then is transmitted to the mobile device, the network transmission burden may be greatly relieved, and the playback cache of the mobile phone is reduced, thereby effectively minimizing the real-time playback delay of an audio.

Figure 13:
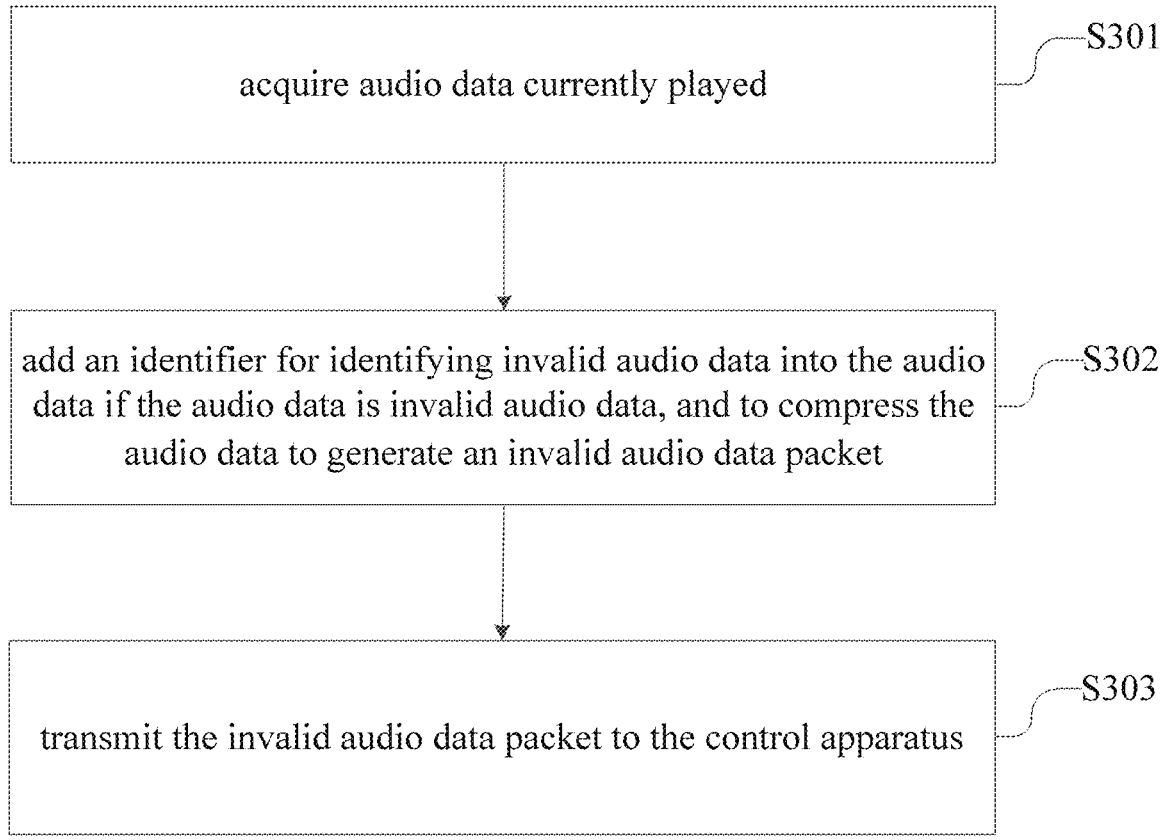
FIG. 13 is a second schematic diagram of an audio transmitting method according to some embodiments of the present disclosure.

Referring to FIG. 13, in some embodiments of the present disclosure, an audio transmitting method which is performed by the smart TV, includes the following steps.

Step S301 is to acquire audio data currently played.

In the real-time audio playing process, the smart TV may continuously record sounds being played by the system, namely continuously acquire the audio data of the program currently being played; in the recording process, the smart TV is in a recording stage all the time without detecting whether there is an audio file being output at this moment.

Step S302 is to add an identifier for identifying invalid audio data into the audio data if the audio data is invalid audio data, and to compress the audio data to generate an invalid audio data packet.

Step S303 is to transmit the invalid audio data packet to the control apparatus. Alternatively, if the audio data acquired by the smart TV is the invalid audio data, the smart TV will not transmit the audio data to the control apparatus.

Through the method above, the network transmission burden is relieved, and the real-time playback delay of an audio is optimized.

For example, it is assumed that a user selects to transmit a command for audio data transmission to the control apparatus when a football program is played, and the smart TV starts to record the sounds. In the recording process, the user quits the football program due to mis-operation or the intention to reselect or browse other available programs, and at the moment, there is no actual audio data being played in the audio player. However, since the recording will not be thus stopped, the audio data acquired by the smart TV are actually null when no football program is played, and the audio data are the so called invalid audio data.

In some embodiments, the method further includes: transmitting the valid audio data to the control apparatus if the audio data are valid audio data.

In some embodiments, the method further includes: determining the audio data as the invalid audio data if the acquired audio data are a complete frame of audio data and one or more identifier of the frame of audio data is a preset identifier.

For example, the preset identifier is 0x00. A frame of audio data where all are 0x00 is called invalid audio data.

In particular, to determine whether a frame of audio data is invalid data, cyclic detection may be performed on the first and last bytes of the frame of data. If a byte of the audio data is not 0x00, the audio data are determined as valid audio data; and if each byte of the audio data is 0x00, the audio data are determined as the invalid audio data.

In some embodiments, step S302 further includes:

determining whether all the audio data are invalid bytes;

in response to all the audio data being the invalid bytes, adding an identifier to the invalid bytes, and compressing the invalid audio data to generate the invalid audio data packet.

As mentioned above, in a smart TV system developed in accordance with the Linux or Android system, an audio capturing and encoding function provided by a Central Processing Unit (CPU) of the entire smart TV is used to capture a sound of the current screen of the smart TV according to a certain sampling format (e.g. 8 KHz sampling rate, 16 Bit sampling precision, and dual track) to provide audio data in a PCM format. After the smart TV acquires the audio data, the audio data are packed and then transmitted to the mobile phone. The data packet includes the acquired audio data and the current system time of the smart TV. The packing format is as shown in Table 1 above.

A calculation method of an audio data size per frame includes the following.

It is assumed that an audio sampling rate is 8000 Hz, two sampling channels are provided, a bit depth is 16, and a sampling interval is 20 ms, so that the calculation formula (2) of an audio data size per frame is:

$$\frac{\text{Audio sampling rate} * \text{Bit depth} * \text{Sampling channel}}{8 * \text{Sampling interval}} = 640 \text{ (Byte)} \qquad (2)$$

When the smart TV acquires the audio data, the next frame of data normally occupies 640 bytes. If the audio data is valid audio data, the valid audio data of the 640 bytes is transmitted to the control apparatus. If the audio data is invalid data, for such an invalid data frame including all 0x00 data, a frame of network data volume is also occupied in a transmission process. After the mobile device receives the invalid data frame that includes all the 0x00 data, the mobile device adds the invalid data frame into a cache of a player, which also increases the playback cache of a mobile phone.

In some embodiments of the present disclosure, these invalid audio data is compressed, not all the 640 bytes are transmitted, but this all 0x00 audio data is compressed into M bytes. That is, this invalid audio data are reassigned as a data stream including M characters, and the compressed audio data are specifically represented as 0x00 0x00 0x00 0x00 0x00 0x00 0x00 0x00 0x00 0x00 0x00 0x00 0x00 0x00 0x00. M is a positive integer less than 640. In some embodiments, M is more than or equal to 1 and less than or equal to 100.

In some embodiments of the present disclosure, the transmitting of the invalid audio data is also configured to maintain the communication connection between the smart TV and the mobile device. If it is specified that the smart TV needs to transmit a data packet to the mobile device every 20 ms to ensure the communication connection, when the smart TV does not transmit the audio data packet in 20 ms, the connection will be disconnected, causing the mobile device not to receive the audio data in real time while there is still valid audio data to be transmitted. Therefore, although there are no actual audio data, the smart TV may still transmit a data packet to the mobile device every 20 ms.

After the invalid data is compressed, an identifier for indicating that the data in the data packet is the invalid data is added in front of the compressed data in order to enable the mobile device to identify the received invalid data and not transmit the data to the player of the mobile device. For example, N bytes are added in front of the M bytes, and N is a natural number. The identifier information is located on the previous 5 bytes of the audio data. The identifier information may be represented as 0x01 0x02 0x03 0x04 0x05. An agreement can be made with the control apparatus in advance to select which identifier(s) as identification information for indicating invalid data.

The generated invalid data packet includes the invalid audio data identification information and the M digits of compressed invalid audio data.

For example, the identification information for indicating invalid audio data is 0x01 0x02 0x03 0x04 0x05, and all the 0x00 audio data is compressed into 20 bytes. That is, this period of invalid audio data is reassigned as a data stream of 20 bytes, and the compressed audio data is represented as 0x01 0x02 0x03 0x04 0x05 0x00 0x00 0x00 0x00 0x00 0x00 0x00 0x00 0x00 0x00 0x00 0x00 0x00 0x00 0x00.

In some embodiments, before step S301, the method further includes: controlling the smart TV to enter a recording state to perform audio recording on the smart TV.

Figure 14:
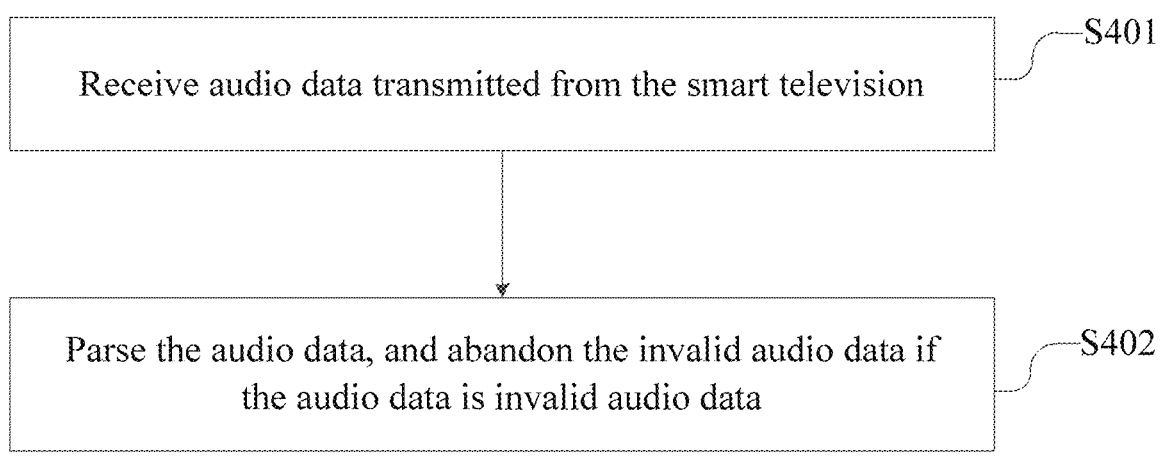
FIG. 14 is a second schematic diagram of an audio playing method according to some embodiments of the present disclosure.

Referring to FIG. 14, in some embodiments of the present disclosure, an audio playing method which is performed by the mobile device, including the following steps.

Step S401 is to receive audio data transmitted from the smart TV.

Step S402 is to parse the audio data, and to abandon invalid audio data if the audio data is the invalid audio data.

Through the method, the playback cache of the control apparatus is reduced, and the real-time playback delay of an audio has been optimized.

For example, the smart TV is a smart TV. When the audio data received by the mobile device is the invalid audio data, this piece of invalid audio data is abandoned and is not written into a cache of a mobile phone player. The audio data is played when the audio data is valid audio data.

In some embodiments, the audio data is played when the audio data is valid audio data.

In some embodiments, upon receiving the audio data transmitted from the smart TV, determining whether the audio data is invalid audio data according to identification information in the audio data.

In some embodiments, the identification information is located in the previous N bytes of the audio data, and N is a natural number.

For example, the identification information is located in the previous 5 bytes of the audio data. The identification information may be represented as 0x01 0x02 0x03 0x04 0x05. An agreement can be made in advance to select which identifier(s) as identification information for indicating valid audio data.

In some embodiments, said audio data is played if the audio data is the valid audio data includes: the valid audio data is stored into a playback cache if the audio data is determined as the valid audio data.

Before playing the audio data, the mobile phone may place the audio data received by the upper layer application into a cache queue, and a system player of the mobile phone reads the data from the cache queue during playing. After the playing is completed, the played data may be deleted from the cache queue. If an upper-layer application writes data into the cache queue too fast, and the player reads the data from the cache queue slowly, more and more data will be cached in this queue.

Figure 15:
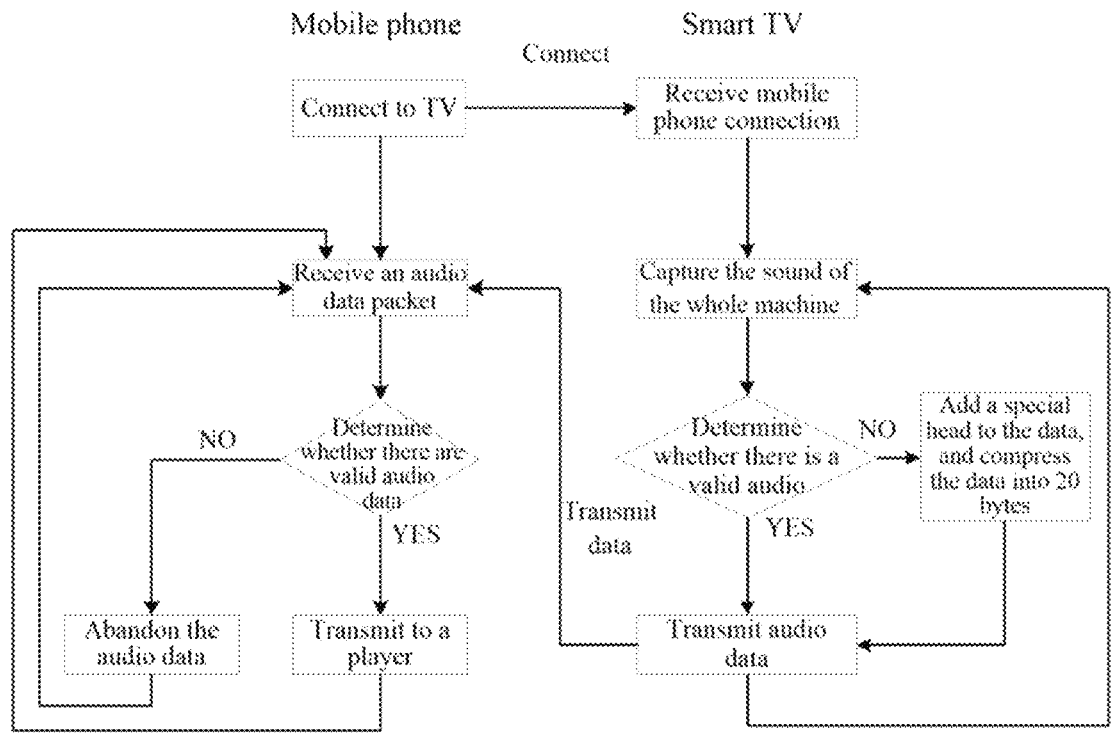
FIG. 15 is a second schematic diagram of an overall process of delay optimization according to some embodiments of the present disclosure.

Referring to FIG. 15, illustrating an overview flowchart of delay optimization according to some embodiments of the present disclosure, the main specific processing flow of the smart TV and the mobile phone includes the following processes.

The smart TV captures a sound of the entire machine (the smart TV) upon receiving the connection information of the mobile device, and determines whether the captured sound is a valid audio. A specific determination method is further discussed below.

For example, the mobile device may be a mobile phone. After the smart TV acquires a frame of audio data, the smart TV determines whether all this frame of audio data is 0x00, namely determines whether the data of 640 bytes acquired by the smart TV at one time is 0x00. If all the data is 0x00, it is determined that this block of data is invalid audio data. If a portion of frame data is not the 0x00, but the frame data includes data such as 0x12, it is determined that this block of data is valid audio data.

When the data acquired by the smart TV is valid audio data, the valid audio data is transmitted to the mobile device frame by frame. When the data acquired by the smart TV is invalid audio data, the invalid audio data is optimized firstly, that is, the invalid audio data, which is all 0x00, of the 640 bytes is reassigned as a data stream (or false data) including 20 characters. For example, in the data stream including the 20 characters, the previous 5 characters may be defined as 0x01 0x02 0x03 0x04 0x05 (namely the identification information for indicating the invalid audio data, and the identification information is not limited to 0x01 0x02 0x03 0x04 0x05, and the previous 5 characters may also be defined as 0x01 0x01 0x02 0x02 0x02 and the like), and the latter 15 characters are all 0x00, which may be represented as 0x01 0x02 0x03 0x04 0x05 0x00 0x00 0x00 0x00 0x00 0x00 0x00 0x00 0x00 0x00 0x00 0x00 0x00 0x00 0x00. In this way, this block of invalid audio data of 640 bytes is compressed into data of 20 bytes, and the smart TV then transmits the data of 20 bytes to the mobile device.

When the mobile device receives the audio data packet transmitted from the smart TV, whether the received audio data are valid audio data is determined at first. If the mobile device receives the above data stream including 20 bytes: 0x01 0x02 0x03 0x04 0x05 0x00 0x00 0x00 0x00 0x00 0x00 0x00 0x00 0x00 0x00 0x00 0x00 0x00 0x00 0x00, the previous 5 bytes 0x01 0x02 0x03 0x04 0x05 of the data are analyzed to determine that the received data is invalid audio data (this block of invalid audio data has no sound in the smart TV), and no data will be written into a cache of a mobile phone player, and this block of invalid audio data is abandoned (in this way, audio cached data of a mobile phone system may be cleared up). If the mobile device receives the data stream of 640 bytes instead of the above data including 20 bytes, it is determined that the received data is valid audio data, and this block of valid audio data is all written into the cache of the mobile phone player.

Figure 16:
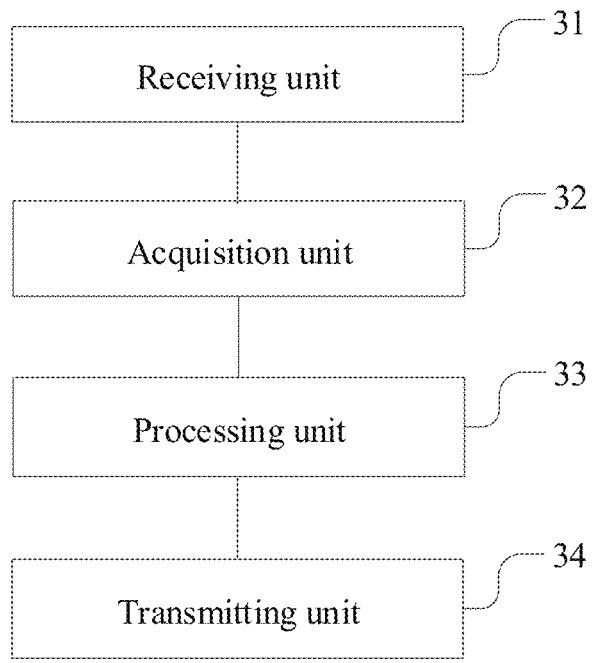
FIG. 16 is a third schematic diagram of a smart TV according to some embodiments of the present disclosure.

Referring to FIG. 16, in some embodiments of the present disclosure, a smart TV, includes:

a receiving unit 31, configured to receive a command for audio data transmission transmitted from a control apparatus;

an acquisition unit 32, configured to acquire audio data currently being played;

a processing unit 33, configured to add identification information to the audio data if the audio data is invalid audio data, and compress the audio data to generate an invalid audio data packet;

a transmitting unit 34, configured to transmit the invalid audio data packet to a control apparatus.

Figure 17:
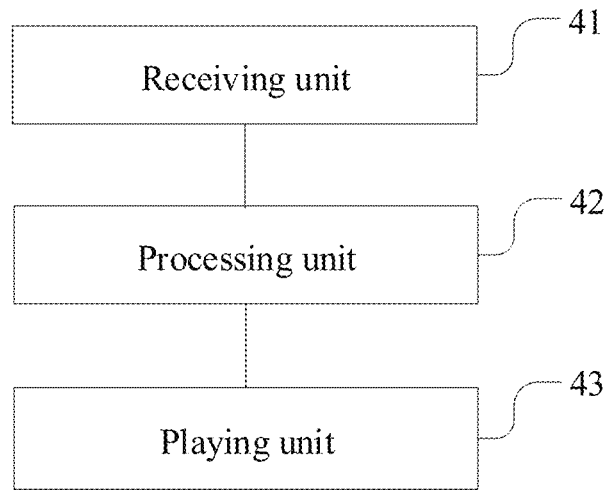
FIG. 17 is a second schematic diagram of a control apparatus according to some embodiments of the present disclosure.

Referring to FIG. 17, in some embodiments of the present disclosure, an control apparatus, includes:

a receiving unit 41, configured to receive audio data transmitted from the smart TV;

a processing unit 42, configured to parse the audio data, and abandon invalid audio data in response to the audio data being invalid audio data; and a playing unit 43, configured to play the audio data in response to the audio data being valid audio data.

Figure 18:
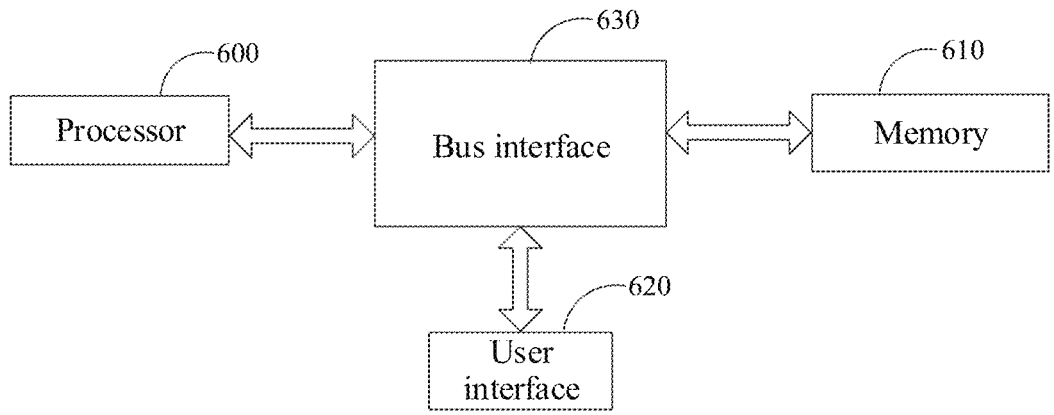
FIG. 18 is a fourth schematic diagram of a smart TV according to some embodiments of the present disclosure.

Referring to FIG. 18, in some embodiments of the present disclosure, a smart TV, includes:

a processor 600, configured to read a computer program in a memory 610 to control the smart TV to:

acquire audio data currently played;

add identification information for indicating invalid audio data to the audio data in response to the audio data being invalid audio data, and compress the audio data with identification information to generate an invalid audio data packet;

transmit the invalid audio data packet to the control apparatus.

Through the smart TV, the network transmission burden is relieved, and the real-time playback delay of an audio is optimized.

The smart TV further includes a user interface 620 and a bus interface 630. The processor 600 is connected to the memory 610 via the bus interface 630, and the user interface 620 is connected to the bus interface 630.

In some embodiments, the processor 600 is further configured to read the computer program to control the smart TV to: transmit the valid audio data to the control apparatus if the audio data are valid audio data.

In some embodiments, the processor 600 is further configured to read the computer program to control the smart TV to:

determine whether all the audio data is invalid bytes;

add the identification information for indicating invalid audio data to the audio data if all the audio data is the invalid bytes; and compress the invalid audio data to generate the invalid audio data packet.

In some embodiments, the acquired audio data is a complete frame of audio data, and the audio data is determined as the invalid audio data if one or more identifiers of the frame of audio data is a preset identifier.

In some embodiments, the processor 600 is further configured to read the computer program to control the smart TV to:

control the smart TV to enter a recording state to perform audio recording in the smart TV before acquiring the audio data of a currently played content.

Figure 19:
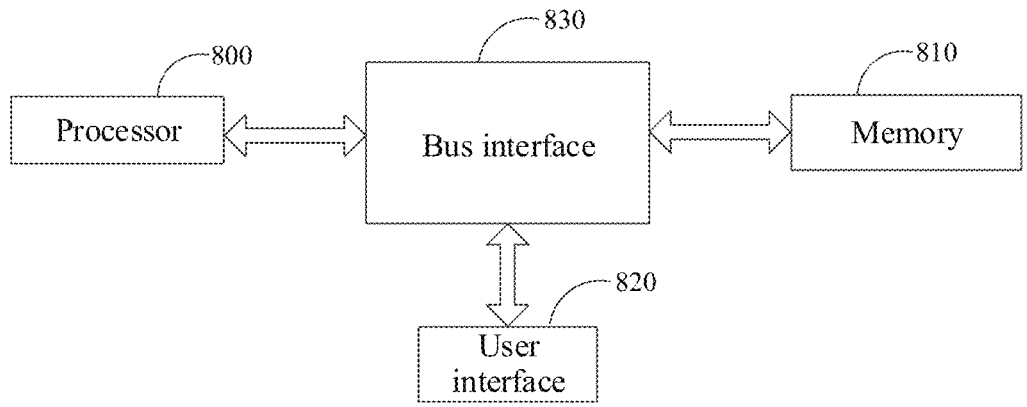
FIG. 19 is a third schematic diagram of a control apparatus according to some embodiments of the present disclosure.

Referring to FIG. 19, in some embodiments of the present disclosure, a control apparatus, includes:

a processor 800, configured to execute a computer program in a memory 810 to cause the control apparatus to:

receive audio data transmitted from the smart TV.

parse the audio data, and abandon invalid audio data in response to the audio data being the invalid audio data.

Through the control apparatus, the playback cache of the control apparatus is cleared, and the real-time playback delay of an audio is optimized.

The control apparatus further includes a user interface 820 and a bus interface 830. The processor 800 is connected to the memory 810 via the bus interface 830, and the user interface 820 is connected to the bus interface 830.

In some embodiments, the processor 600 is further configured to execute the computer program to cause the control apparatus to: play the audio data if the audio data is valid audio data.

In some embodiments, the processor 600 is further configured to execute the computer program to cause the control apparatus to: determine whether the audio data is invalid audio data according to identification information in the audio data upon receiving the audio data transmitted from the smart TV.

In some embodiments, the identification information is located in the previous N bytes of the audio data, and N is a natural number.

In some embodiments, the processor 600 is further configured to execute the computer program to cause the control apparatus to: store the valid audio data into a playback cache if the audio data is determined as the valid audio data.

In FIG. 11, 12, 18 or 19, the bus architecture may include any number of interconnected buses and bridges, and is particularly composed of one or more of processors represented by the processors 300, 400, 600 or 800 and the various circuits of memories represented by the memories 310, 410, 610 or 810 together. The bus architecture may also link various other circuits such as peripherals, voltage regulators and power management circuits, which are well known in the art and, therefore, will not be further described herein. A bus interface provides an interface.

The embodiments of the present application provides a display device. The display device may be a desktop computer, a portable computer, a smart phone, a tablet computer, a Personal Digital Assistant (PDA), and the like. The display device may include a Central Processing Unit (CPU), a memory, an input/output device, and the like. The input device may include a keyboard, a mouse, a touch screen, and the like, and the output device may include a display device, such as a Liquid Crystal Display (LCD), a Cathode Ray Tube (CRT), and the like.

For different display devices, in some embodiments, a user interface 320, 420, 620 or 820 may be an interface capable of externally and internally connecting desired devices, and the connected devices include, but not limited to, a keypad, a display, a speaker, a microphone, a joystick, and the like.

The processor is responsible for managing the bus architecture and performing routine processing, and the memory may store data used while the processor performs operations.

In some embodiments, the processor may be a Central Processing Unit (CPU), an Application Specific Integrated Circuit (ASIC), a Field-Programmable Gate Array (FPGA), or a Complex Programmable Logic Device (CPLD).

The memory may include a Read Only Memory (ROM) and a Random Access Memory (RAM), and provides the processor with program commands and data which are stored in the memory. In the embodiment of the present disclosure, the memory may be configured to store a program of any of the methods provided by the embodiments of the present disclosure.

The processor is configured to perform any of the methods provided by the embodiments of the present disclosure according to the obtained program command by calling a program command stored in the memory.

The embodiments of the present disclosure provides a computer storage medium configured to store a computer program command used by the apparatus provided in the foregoing embodiments of the present disclosure, and the computer program command includes a program for performing any of the methods provided by the foregoing embodiments of the present disclosure.

The computer storage medium may be any available media or data storage devices accessible by a computer, including, but not limited to, a magnetic memory (e.g., a floppy disk, a hard disk, a magnetic tape, a Magneto-Optical disk (MO), etc.), an optical memory (e.g., a CD, a DVD, a BD, an HVD, etc.), a semiconductor memory (e.g., an ROM, an EPROM (Electrically Programmable Read-Only-Memory), an EEPROM (Electrically Erasable Programmable Read-Only Memory), a non-volatile memory (NAND FLASH), a Solid-State Hard Disk (SSD)), and the like.

Based on the above, the audio transmitting and playing methods and the apparatus which are provided by the embodiments of the present disclosure are used to relieve the network transmission burden and clear the playback cache of the control apparatus, thereby optimizing the real-time playback delay of the audio. The phenomenon that the control apparatus may not synchronize the audio data in real time with the smart TV due to a relatively large network delay is avoided.

The audio playing and transmitting methods and apparatuses which are provided by the embodiments of the present disclosure are used to relieve the network transmission burden and clear the playback cache of the control apparatus, thereby optimizing the real-time playback delay of the audio.

Those skilled in the art should understand that the embodiments of the present disclosure may be methods, systems or computer program products. Therefore, the present disclosure may adopt the form of a complete hardware embodiment, a complete software embodiment, or a software and hardware combination embodiment. In addition, the present disclosure may adopt the form of a computer program product implemented on one or multiple computer-available storage media (including, but not limited to, a magnetic disk memory, an optical memory and the like) including computer-available program codes.

The present application is described by referring to flowcharts and/or block diagrams of methods, devices (systems) and computer program products according to the embodiments of the present application. It should be understood that computer program commands may implement each flow and/or each block in the flowcharts and/or the block diagrams and combination of the flows and/or the blocks in the flowcharts and/or the block diagrams. These computer program commands may be provided for a general computer, a dedicated computer, an embedded processor or processing units of other programmable data processing devices to generate a machine, thereby making the commands that are executed by the computer or the processing units of other programmable data processing devices generate apparatuses for realizing specified functions in one or multiple flows of the flowcharts and/or one or multiple blocks of the block diagrams.

These computer program commands also may be stored in a computer readable memory capable of guiding the computer or other programmable data processing devices to work in a specific manner, thereby making the commands that are stored in the computer readable memory generate manufactured products that include command apparatuses. The command apparatuses realize the specified functions in one or multiple flows of the flowcharts and/or one or multiple blocks of the block diagrams.

These computer program commands also may be loaded onto the computer or other programmable data processing devices to execute a series of operation steps on the computer or other programmable data processing devices to generate computer implemented processing, so that the commands executed on the computer or other programmable data processing devices provide steps for realizing the specified functions in one or multiple flows of the flowcharts and/or one or multiple blocks of the block diagrams.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. An audio playing method, comprising:
receiving, by a control apparatus, a first system time data packet transmitted from a smart television, wherein the first system time data packet comprises a first system time of the smart television at which the smart television transmits the first system time data packet to the control apparatus;
calculating, by the control apparatus, a difference between a second system time of the control apparatus at which the control apparatus receives the first system time data packet and the first system time as a first difference;
receiving, by the control apparatus, audio data transmitted from the smart television;
calculating, by the control apparatus, a network delay of transmission of the audio data between the smart television and the control apparatus according to the first difference; and
abandoning, by the control apparatus, the audio data in response to the network delay being greater than a preset threshold;
wherein calculating the network delay of transmission of the audio data between the smart television and the control apparatus comprises:
obtaining, by the control apparatus, a third system time by parsing the audio data, wherein the third system time is a system time of the smart television at which the smart television transmits the audio data;
acquiring, by the control apparatus, a fourth system time at which the control apparatus receives the audio data;
calculating, by the control apparatus, a difference between the fourth system time and the third system time as a second difference; and
determining, by the control apparatus, a difference between the second difference and the first difference as the network delay of transmission of the audio data between the smart television and the control apparatus.

2. The method according to claim 1, further comprising:
transmitting, by the control apparatus, a command for audio data transmission to the smart television, wherein the command is configured to cause the smart television to perform at least one of the following: transmitting audio data of a program being played to the control apparatus, turning off a device speaker of the smart television, or setting a volume output of the smart television to be 0.

3. The method according to claim 1, further comprising:
receiving, by the control apparatus, a command for initiating an application for remote control of the smart television; and
presenting, by the control apparatus, a first user interface for controlling the smart television in response to the command, wherein the first user interface comprises a main control area and a function selection area, wherein the main control area comprises a volume control area and a program switching area, and wherein the function selection area comprises at least one of the following: a sound transmission tab, a homepage tab configured to return to a remote controller homepage, or a keyboard tab configured to invoke a digital keyboard.

4. The method according to claim 3, further comprising:
receiving, by the control apparatus, a selection for the sound transmission tab; and
presenting, by the control apparatus, a second user interface in response to the selection for the sound transmission tab, wherein the second user interface is configured to display information indicating that a sound playing device is the smart television, and a sound transmission switching option configured for switching the sound playing device between the smart television and the control apparatus.

5. The method according to claim 4, further comprising:
receiving, by the control apparatus, a command for selecting the sound transmission switching option;
switching, by the control apparatus, the sound playing device from the smart television to the control apparatus; and
presenting, by the control apparatus, a third user interface in response to the command for selecting the sound transmission switching option, wherein the third user interface is configured to display information indicating that the sound playing device is the control apparatus.

6. The method according to claim 5, further comprising:
transmitting, by the control apparatus, the received audio data to an audio player of the control apparatus upon the sound playing device being switched from the smart television to the control apparatus.

7. The method according to claim 5, further comprising:
receiving, by the control apparatus, a command for closing the sound transmission switching option; and
transmitting, by the control apparatus, a command for stopping sound recording to the smart television in response to the command for closing the sound transmission switching option.

8. The method according to claim 3, further comprising:
establishing, by the control apparatus, communication connection with the smart television before receiving the command for initiating the application for remote control of the smart television.

9. An audio transmitting method, comprising:
transmitting, by a smart television, a first system time data packet to a control apparatus, wherein the first system time data packet comprises a first system time of the smart television at which the smart television transmits the first system time data packet to the control apparatus;
receiving, by the smart television, a command for audio data transmission transmitted from a-the control apparatus; and transmitting, by the smart television, an audio data to the control apparatus, wherein the audio data comprises a second system time of the smart television at which the smart television transmits the audio data, such that the control apparatus calculates a network delay of transmission of the audio data between the smart television and the control apparatus according to the first system time and the second system time; and determines whether to play the audio data according to the network delay;

wherein the control apparatus calculates the network delay of transmission of the audio data between the smart television and the control apparatus by:

calculating a difference between a third system time at which the control apparatus receives the first system time data packet and the first system time as a first difference;

obtaining the second system time by parsing the audio data;

acquiring a fourth system time at which the control apparatus receives the audio data;

calculating a difference between the fourth system time and the second system time as a second difference; and determining a difference between the second difference and the first difference as the network delay of transmission of the audio data between the smart television and the control apparatus.

10. A control apparatus, comprising:

a memory configured to store computer readable program codes; and a processor configured to execute the computer readable program codes to cause the control apparatus to:

receive a first system time data packet transmitted from a smart television, wherein the first system time data packet comprises a first system time of the smart television at which the smart television transmits the first system time data packet to the control apparatus;

calculate a difference between a second system time of the control apparatus at which the control apparatus receives the first system time data packet and the first system time as a first difference;

receive audio data transmitted from the smart television;

obtain a third system time included in the audio data by parsing the audio data, wherein the third system time is a system time of the smart television at which the smart television transmits the audio data;

acquire a fourth system time at which the control apparatus receives the audio data;

calculate a difference between the fourth system time and the third system time as a second difference;

determine a difference between the second difference and the first difference;

calculate a network delay of transmission of the audio data between the smart television and the control apparatus according to the difference between the second difference and the first difference; and abandon the audio data in response to the network delay being greater than a preset threshold.

11. The control apparatus according to claim 10, wherein the processor is further configured to execute the computer readable program codes to control the control apparatus to:

transmit a command for audio data transmission to the smart television, wherein the command for audio data transmission is configured to cause the smart television to perform at least one of the following: transmit audio data of a program being played to the control apparatus, turn off a device speaker of the smart television, or set a volume output of the smart television to be 0.

12. The control apparatus according to claim 11, wherein the processor is further configured to execute the computer readable program codes to control the control apparatus to:

receive a command for initiating an application for remote control of the smart television; and present a first user interface for controlling the smart television in response to the command for initiating the application for remote control of the smart television, wherein the first user interface comprises a main control area and a function selection area, wherein the main control area comprises a volume control area and a program switching area, and wherein the function selection area comprises at least one of the following: a sound transmission tab, a homepage tab configured to return to a remote controller homepage, or a keyboard tab configured to invoke a digital keyboard.

13. The control apparatus according to claim 12, wherein the processor is further configured to execute the computer readable program codes to control the control apparatus to:

receive a selection for the sound transmission tab; and present a second user interface in response to the selection for the sound transmission tab wherein the second user interface is configured to display information indicating that a sound playing device is the smart television, and a sound transmission switching option configured for switching the sound playing device between the smart television and the control apparatus.

14. The control apparatus according to claim 13, wherein the processor is further configured to execute the computer readable program codes to control the control apparatus to:

receive a command for selecting the sound transmission switching option;

switch the sound playing device from the smart television to the control apparatus; and present a third user interface in response to the command for selecting the sound transmission switching option, wherein the third user interface is configured to display information indicating that the sound playing device is the control apparatus.

15. The control apparatus according to claim 14, wherein the processor is further configured to execute the computer readable program codes to control the control apparatus to:

transmit the received audio data to an audio player of the control apparatus upon the sound playing device being switched from the smart television to the control apparatus.

16. The control apparatus according to claim 14, wherein the processor is further configured to execute the computer readable program codes to control the control apparatus to:

receive a command for closing the sound transmission switching option; and transmit a command for stopping sound recording to the smart television in response to the command for closing the sound transmission switching option.

17. The control apparatus according to claim 12, wherein the processor is further configured to execute the computer readable program codes to control the control apparatus to:

establish communication connection with the smart television before receiving the command for initiating the application for remote control of the smart television.

* * * * *